US012699399B2

(12) United States Patent
Li et al.

(10) Patent No.: US 12,699,399 B2
(45) Date of Patent: Aug. 4, 2026

(54) METHOD FOR AREA DIVIDING IN MAP FOR MOBILE ROBOT, MOBILE ROBOT AND COMPUTER-READABLE STORAGE MEDIUM

(71) Applicants: Best Epoch Technology Co. LTD, Shenzhen (CN); UBTECH ROBOTICS CORP LTD, Shenzhen (CN)

(72) Inventors: Meng Li, Shenzhen (CN); Xiangbin Huang, Shenzhen (CN)

(73) Assignees: BEST EPOCH TECHNOLOGY CO. LTD, Shenzhen (CN); UBTECH ROBOTICS CORP LTD, Shenzhen (CN)

( * ) Notice: Subject to any disclaimer, the term of this patent is extended or adjusted under 35 U.S.C. 154(b) by 45 days.

(21) Appl. No.: 18/910,009

(22) Filed: Oct. 9, 2024

(65) Prior Publication Data

US 2025/0199534 A1     Jun. 19, 2025

(30) Foreign Application Priority Data

Dec. 18, 2023     (CN) .......................... 202311751209.7

(51) Int. Cl.
*G05D 1/246* (2024.01)
*G05D 1/648* (2024.01)
*G05D 105/10* (2024.01)

(52) U.S. Cl.
CPC .......... *G05D 1/246* (2024.01); *G05D 1/6482* (2024.01); *G05D 2105/10* (2024.01)

(58) Field of Classification Search
None
See application file for complete search history.

(56) References Cited

FOREIGN PATENT DOCUMENTS

CN            114429477 A  *  5/2022   ............... G06T 7/12

* cited by examiner

*Primary Examiner* — Shayne M. Gilbertson

(57) ABSTRACT

A method for area dividing in a map for a mobile robot includes: obtaining a binary map corresponding to a target area; determining one or more first areas in the binary map according to partition information, wherein the one or more first areas are undivided areas in the binary map, the partition information corresponds to second areas in the binary map, and the second areas are divided areas in the binary map; for each first area of the one or more first areas, determining, according to size of the first area, the first area as a newly added second area, or merging the first area into a third area that is one of the second areas, thereby obtaining a target area-dividing map; and controlling the mobile robot according to the target area-dividing map.

20 Claims, 10 Drawing Sheets

┌─ S101
Obtain a binary map of a target area

↓ ┌─ S102
Determine one or more first areas in the binary map according to partition information, wherein the one or more first areas are undivided areas in the binary map, the partition information corresponds to second areas in the binary map, and the second areas are divided areas in the binary ma ↓ ┌─ S103
For each first area of the one or more first areas, determine, according to size of the first area, the first area as a newly added second area, or merging the first area into a third area that is one of the second areas, thereby obtaining a target area-dividing map ↓ ┌─ S104
Control the mobile robot according to the target area-dividing map

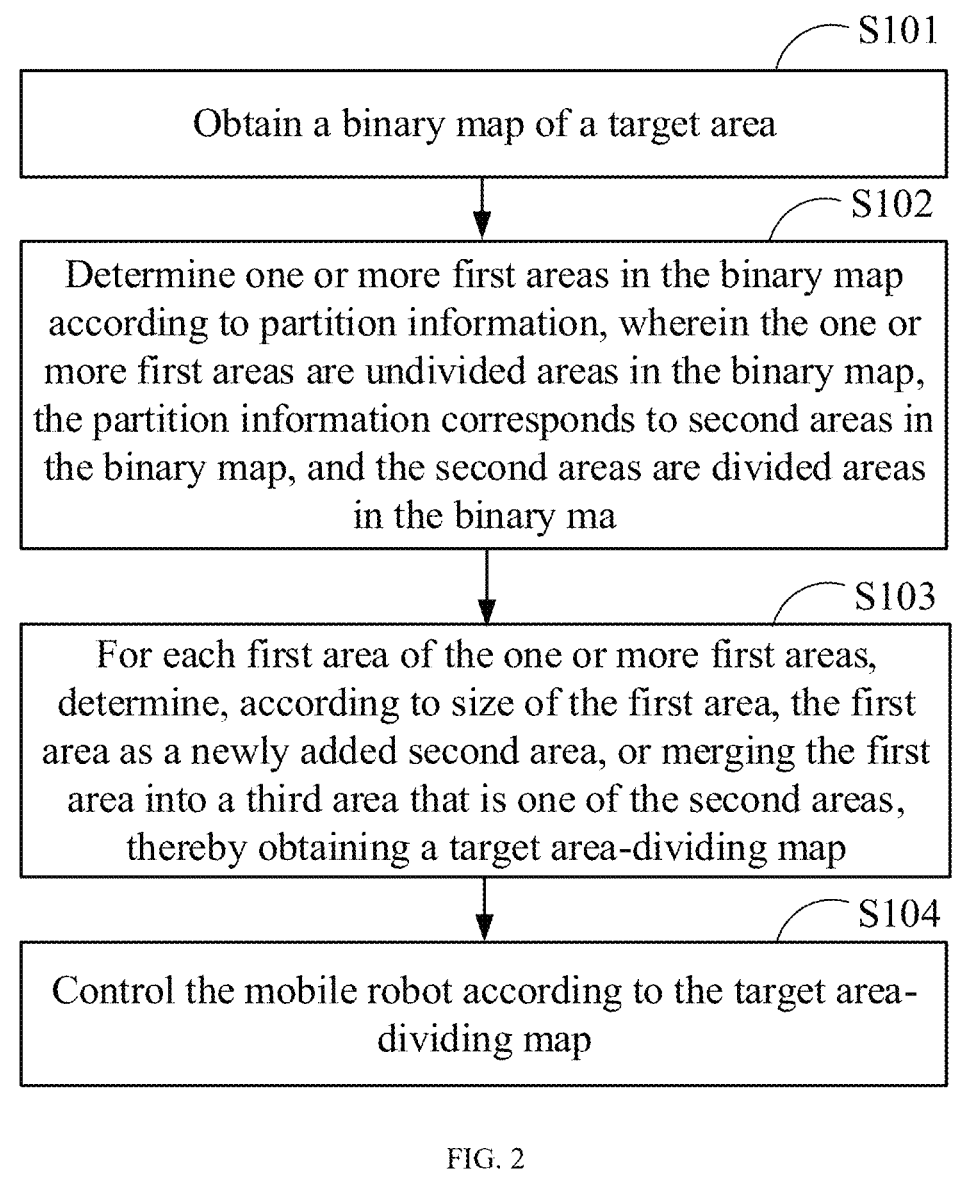

S101

Obtain a binary map of a target area

S102

Determine one or more first areas in the binary map according to partition information, wherein the one or more first areas are undivided areas in the binary map, the partition information corresponds to second areas in the binary map, and the second areas are divided areas in the binary ma

S103

For each first area of the one or more first areas, determine, according to size of the first area, the first area as a newly added second area, or merging the first area into a third area that is one of the second areas, thereby obtaining a target area-dividing map

S104

Control the mobile robot according to the target area-dividing map

FIG. 2

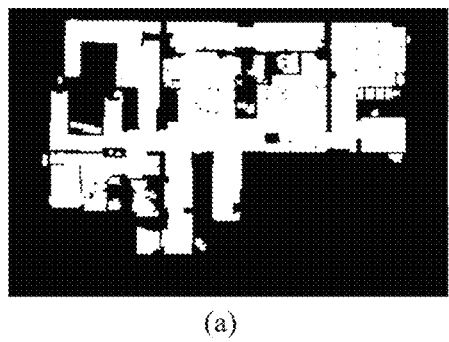
(a)
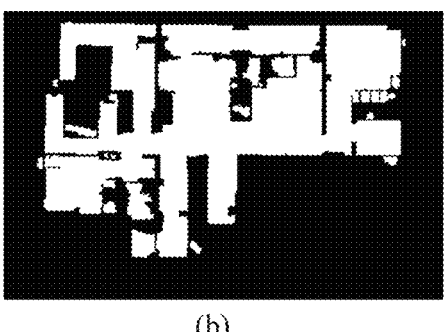
(b)
FIG. 3

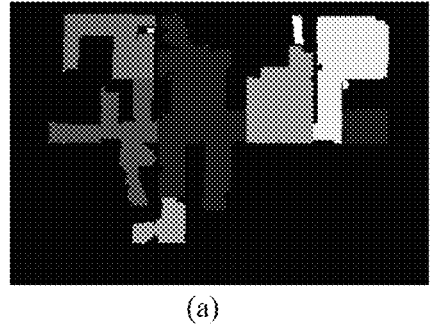
(a)
(b)
FIG. 4

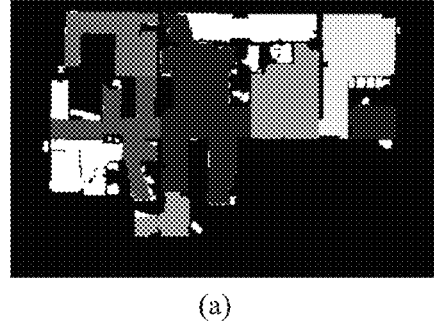
(a)
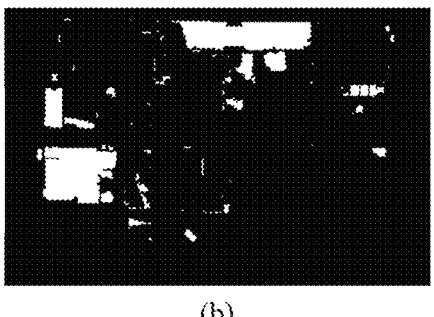
(b)
FIG. 5

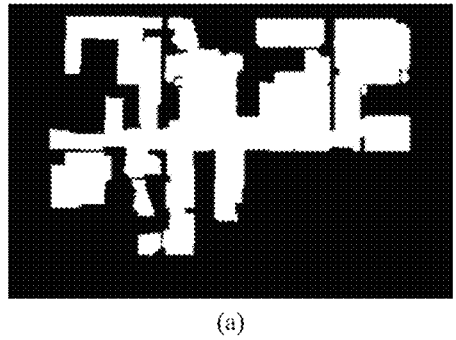
(a)
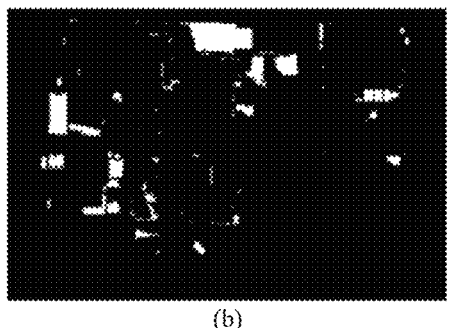
(b)
FIG. 7

(a)

(b)

(c)

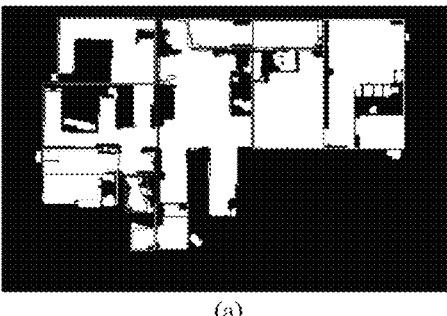
(a)
(b)
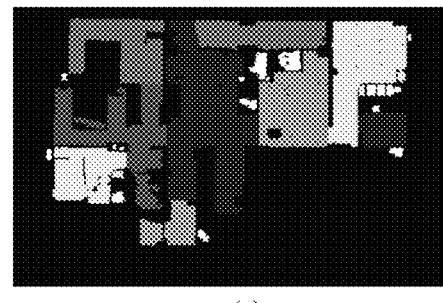
(c)
FIG. 9

METHOD FOR AREA DIVIDING IN MAP FOR MOBILE ROBOT, MOBILE ROBOT AND COMPUTER-READABLE STORAGE MEDIUM

CROSS REFERENCE TO RELATED APPLICATIONS

This application claims priority to Chinese Patent Application No. CN 202311751209.7, filed Dec. 18, 2023, which is hereby incorporated by reference herein as if set forth in its entirety.

TECHNICAL FIELD

The present disclosure generally relates to mobile robots, and in particular relates to a method for area dividing in a map for a mobile robot, mobile robot and computer-readable storage medium.

BACKGROUND

Mobile robots, including cleaning robots, are becoming increasingly popular among users. During the cleaning process, a cleaning robot can use lasers or visual sensors to create a map corresponding to a target area, so as to clean the target area based on the map. To improve the cleaning performance and efficiency, the cleaning robot needs to perform partitioned cleaning based on the created map, such as cleaning by rooms. However, when the cleaning robot cleans again based on an existing partitioned map, changes in the environment may lead to the appearance of new areas that do not belong to the partitions in the existing map, which reduces the cleaning efficiency. Therefore, accurately partitioning these newly appeared areas has become an urgent problem for professionals in this field to solve.

Therefore, there is a need to provide a method for area dividing in a map for a mobile robot to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a method for area dividing in a map for a mobile robot according to one embodiment.

FIG. 3 is a schematic diagram of two binary maps according to one embodiment.

FIG. 4 is a schematic diagram of two binary maps according to another embodiment.

FIG. 5 illustrates a schematic diagram of an undivided map according to one embodiment.

FIG. 7 illustrates a schematic diagram of an application scenario according to one embodiment.

FIG. 9 illustrates a schematic diagram of an application scenario according to another embodiment.

DETAILED DESCRIPTION

Figure 1:
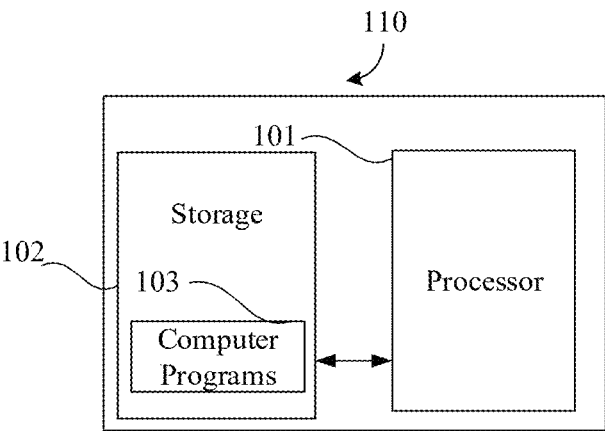
FIG. 1 is a schematic block diagram of a mobile robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

During the cleaning process, a cleaning robot can use lasers or visual sensors to create a map corresponding to a target area, so as to clean the target area based on the map. To improve the cleaning performance and efficiency, the cleaning robot needs to perform partitioned cleaning based on the created map, such as cleaning by rooms. However, when the cleaning robot cleans again based on an existing partitioned map, changes in the environment may lead to the appearance of new areas that do not belong to the partitions in the existing map, which reduces the cleaning efficiency. Therefore, accurately partitioning these newly appeared areas has become an urgent problem for professionals in this field to solve.

To solve the above problems, the present disclosure provides a method for area dividing in a map for a mobile robot, mobile robot and computer-readable storage medium. In the method, after obtaining the binary map corresponding to a target area, the mobile robot can determine the first areas in the binary map based on the partition information from the previous partitioning. The first areas are undivided areas in the binary map, and the partition information corresponds to the second areas in the binary map, which are already divided areas. Then, for each first area, depending on the size of the first area, the mobile robot can designate the first area as a new second area or merge it into an already partitioned third area, where the third area is one of the second area. This allows accurate partitioning of newly appeared areas, reducing the complexity of the map and making it easier for the mobile robot to clean the target area based on the partitions. This improves the cleaning efficiency of the mobile robot and enhances the user experience.

The mobile robot can be, but are not limited to, a cleaning robot (e.g., smart vacuum cleaner, smart robot mop, window cleaning robot), a companion mobile robot (e.g., smart electronic pet, nanny robot), a service mobile robot (e.g., reception robot for hotels, motels, and meeting venues), an industrial inspection smart device (e.g., power inspection robot, smart forklift), and a security robot (e.g., household or commercial smart security robot). These examples of robots are provided for illustration purposes only and do not constitute any limitations.

FIG. 1 shows a schematic block diagram of a mobile robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for area dividing in a map for a mobile robot, such as steps S101 to S104 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 10:
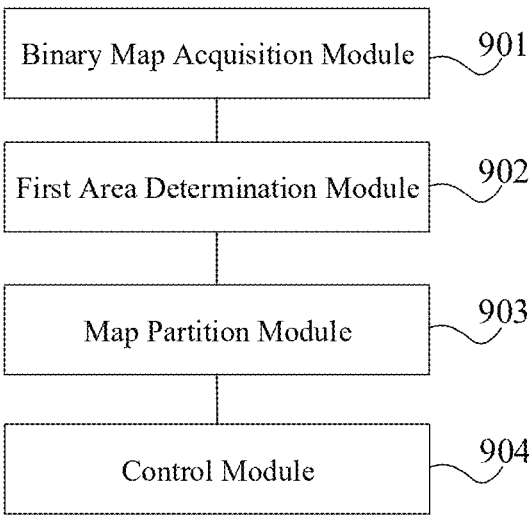
FIG. 10 is a schematic block diagram of device for area dividing in a map for a mobile robot according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into a binary map acquisition module 901, a first area determination module 902, a map partition module 903 and a control module 904 as shown in FIG. 10.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a method for area dividing in a map for a mobile robot according to one embodiment. As an example, but not a limitation, the method can be implemented by the robot 110. The method may include the following steps.

Step S101: Obtain a binary map of a target area.

In one embodiment, the target area can be a house, hospital ward, or office space, among other areas. The target area may include all the rooms in the house or only a portion of the rooms, and the embodiment does not impose specific limitations on this aspect. Similarly, for areas such as hospital wards or office spaces, the target area may include all the wards or all the office spaces on a floor, or only a portion of the wards or office spaces on a floor.

In one embodiment, the binary map corresponding to the target area can be the binary map that the mobile robot has currently obtained for the target area. It should be understood that the binary map corresponding to the target area can be a binary map autonomously constructed by the mobile robot, for example, a binary map created after the mobile robot has cleaned the target area initially, or a binary map constructed and sent to the mobile robot by another electronic device.

In one embodiment, a binary map refers to a map that uses only white and black areas. In this context, the white areas can represent open spaces, meaning that the white areas are regions where the mobile robot can move. The black areas can represent obstacle areas (i.e., areas with obstacles) or unknown areas, meaning that the black areas are regions where the mobile robot cannot move.

It can be understood that area dividing in the map refers to dividing the areas where the mobile robot can move (i.e., the white areas) into partitions.

In one embodiment, after obtaining the binary map corresponding to the target area, the mobile robot can perform denoising on the binary map to remove scattered obstacles and obtain a denoised binary map (also referred to as a raw_map). This process reduces the impact of noise on map partitioning and improves the efficiency of the map partitioning. It can be understood that the binary maps described below can all be denoised binary maps.

FIG. 3 is a schematic diagram of two binary maps according to one embodiment. Assume that in a specific application scenario, the mobile robot obtains the original binary map corresponding to the target area, as shown in sub-figure (a) in FIG. 3. Subsequently, the mobile robot can perform denoising on the original binary map, resulting in the binary map shown in sub-figure (b). The following exemplary explanation will be based on the binary map corresponding to the target area, as shown in sub-figure (b).

Step S102: Determine one or more first areas in the binary map according to partition information, wherein the one or more first areas are undivided areas in the binary map, the partition information corresponds to second areas in the binary map, and the second areas are divided areas in the binary map.

In one embodiment, the partition information can be the information from the previous map partitioning, i.e., information of partitioning the previously obtained binary map (hereinafter referred to as binary map B for distinction) corresponding to the target area. The partition information may include the point set (e.g., pixels) corresponding to the divided areas (hereinafter referred to as the second areas). It can be understood that the previously obtained binary map corresponding to the target area and the currently obtained binary map corresponding to the target area (i.e., the binary map corresponding to the target area obtained in step S101, hereinafter referred to as binary map A for distinction) may or may not be the same.

After obtaining the partition information corresponding to the previous map partitioning, the mobile robot can obtain the divided map (hereinafter referred to as divided map A), i.e., the map obtained after the previous map partitioning, based on the partition information. It can then extract the contour (room_segment_contour) and bounding rectangles (room_rect) of each second area in divided map A. It is understood that when divided map A includes multiple divided second areas, the mobile robot can extract the contour and the bounding rectangle of each second area separately based on the partition information.

In one embodiment, after extracting the contour of each second area in divided map A, the mobile robot can determine the areas in binary map A corresponding to the second areas based on their contours. It can then determine the areas in binary map A corresponding to the second areas as the divided second areas.

FIG. 4 is a schematic diagram of two binary maps according to another embodiment. Assume that in a specific application scenario, the divided map A (i.e., the map from the previous partitioning of the target area) corresponding to the target area obtained by the mobile robot is as shown in sub-figure (a) in FIG. 4, and the binary map A corresponding to the target area currently obtained by the mobile robot is as shown in sub-figure (b) in FIG. 4. At this point, the mobile robot can extract the contours of the second areas as shown in sub-figure (a) in FIG. 4 and determine the corresponding areas in binary map A as the divided second areas based on the contours of the second areas, thereby obtaining the binary map A as shown in sub-figure (b) in FIG. 4.

In one embodiment, the mobile robot can create a new undivided map (un_segment_map, hereinafter referred to as the first undivided map), copy binary map A to the first undivided map, and fill the second areas in the first undivided map as obstacles based on the contours of the second areas, thereby removing the divided areas from binary map A and obtaining the final undivided map (hereinafter referred to as the second undivided map). The second undivided map may include one or more undivided areas (i.e., the first areas). In other words, the areas included in the second undivided map can be newly added unsegmented areas.

FIG. 5 illustrates a schematic diagram of an undivided map according to one embodiment. Assume that in a specific application scenario, the divided map B corresponding to the target area obtained by the mobile robot is as shown in sub-figure (a) in FIG. 5, and the binary map A corresponding to the target area currently obtained by the mobile robot is as shown in sub-figure (b) in FIG. 3. The mobile robot can create the first undivided map, copy binary map A to the first undivided map, and fill the second areas in the first undivided map as obstacles based on the contours of the second areas, thereby obtaining the second undivided map as shown in sub-figure (b) in FIG. 5.

In another embodiment, the mobile robot can create the first undivided map and fill the second areas in the first undivided map based on the contours of the second areas, thereby obtaining the third undivided map. Then, the mobile robot can perform a bitwise XOR operation between binary map A and the third undivided map, setting the already divided second areas in the third undivided map as black areas through the bitwise XOR operation, resulting in second undivided map. The second undivided map may include one or more first areas.

Step S103: For each first area of the one or more first areas, determine, according to size of the first area, the first area as a newly added second area, or merging the first area into a third area that is one of the second areas, thereby obtaining a target area-dividing map.

In one embodiment, the size of each first area can be determined based on the length and width of the first area.

Step S104: Control the mobile robot according to the target area-dividing map.

In one embodiment, for each first area, the mobile robot can determine the length and/or width of the first area. If the length and width of one first area are both greater than or equal to a first preset threshold, the mobile robot can determine the area of that first area. If the area of the first area is greater than or equal to a second preset threshold, the mobile robot can identify this first area as a "large" area. In this case, the mobile robot can determine the first area as a newly added second area. If the length or width of the first area is less than the first preset threshold, or if the area of the first area is less than the second preset threshold, the mobile robot can identify the first area as a "small" area, not suitable for a new partition. In this case, the mobile robot can merge the first area into one of the already divided second areas (hereinafter referred to as the third area).

It is understood that the first preset threshold and the second preset threshold can be determined based on the actual scenario, and the present disclosure does not impose specific limitations on this. For example, the first preset threshold can be set based on the width of a door in the actual scenario, such as determining the first preset threshold to be 1 meter. Similarly, the second preset threshold can be set based on the minimum room area in the actual scenario, such as determining the second preset threshold to be 2.5 square meters.

In one embodiment, after obtaining the aforementioned second undivided map, the mobile robot can fill the first areas in the second undivided map that have a length or width smaller than the first preset threshold as non-working areas, thereby obtaining an undivided map that only contains large areas (hereinafter referred to as the fourth undivided map). Subsequently, the mobile robot can extract the contours of the first areas in the fourth undivided map.

When the number of extracted contours is not zero, it indicates that there are large areas in the fourth undivided map. In this case, for each first area (hereinafter referred to as first area A) in the fourth undivided map, the mobile robot can determine the area of first area A. If the area of first area A is greater than or equal to the second preset threshold, the mobile robot can determine first area A as a newly added second area, i.e., adding first area A to the already divided areas. Additionally, the mobile robot can add the contour of first area A to the contours corresponding to the divided areas. Furthermore, the mobile robot can obtain the bounding rectangle of first area A and add it to the bounding rectangles corresponding to the divided areas.

If the area of first area A is smaller than the second preset threshold, the mobile robot can delete the contour of first area A, meaning it will not determine first area A as a newly added second area. Additionally, when the number of extracted contours is zero, it indicates that there are no large areas in the fourth undivided map. In this case, the mobile robot does not need to add any new partitions.

For first areas that cannot be determined as newly added partitions (hereinafter referred to as first areas B), the mobile robot can determine the corresponding already divided second areas (i.e., third areas) for each first area B. It can then merge each first area B into its corresponding third area, meaning that each first area B is merged into its corresponding divided area. It should be understood that first areas B may include first areas A with an area smaller than the second preset threshold, and they may include first areas with a length or width smaller than the first preset threshold.

Figure 6:
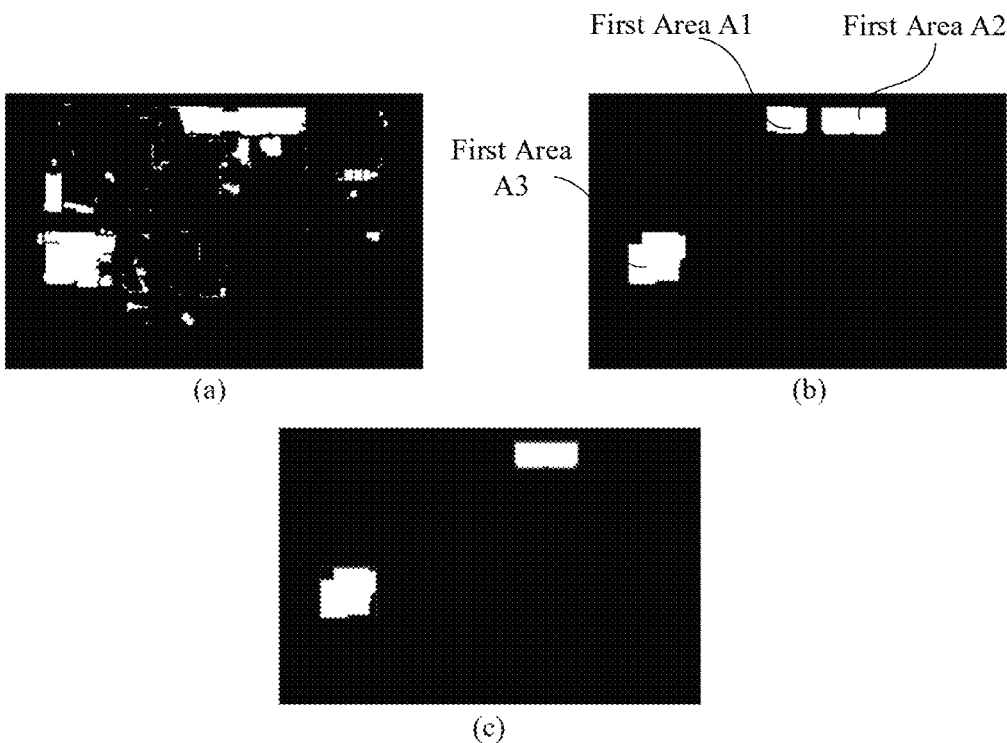
FIG. 6 illustrates a schematic diagram of another undivided map according to one embodiment.

FIG. 6 illustrates another schematic diagram of an undivided map according to one embodiment. Assume that the second undivided map obtained by the mobile robot is as shown in sub-figure (a) in FIG. 6. After the mobile robot fills the first areas in the second undivided map with a length or width smaller than the first preset threshold as non-working areas, it can obtain the fourth undivided map as shown in sub-figure (b) in FIG. 6.

As shown in sub-figure (b) in FIG. 6, the fourth undivided map may include first areas A1, A2, and A3. Assume that the area of first area A1 is smaller than the second preset threshold, while the areas of first areas A2 and A3 are larger than the second preset threshold. In this case, the mobile robot can determine first areas A2 and A3 as newly added second areas, resulting in the map with newly added second areas as shown in sub-figure (c) in FIG. 6.

The process of merging each first area B into the corresponding third area is described in detail below.

In one embodiment, the mobile robot can create a new black map segment_map and fill the second areas based on the contours of divided second areas in the newly created black map, resulting in a divided map (hereinafter referred to as divided map B). The divided second areas can include both the previously divided second areas and the newly added second areas. That is, if there is a newly added second area in the newly added first areas, that is, there is a first area whose length and width are greater than or equal to the first preset threshold and whose area is greater than or equal to the second preset threshold, then the divided second areas can include the newly added second areas. In other words, the divided map B may or may not be the same as the aforementioned divided map A.

In one embodiment, after obtaining divided map B, the mobile robot can update the undivided map (e.g., the second undivided map) based on divided map B and binary map A. For example, the mobile robot can perform a bitwise XOR operation between binary map A and divided map B, setting the areas that are white in both maps to black, thereby obtaining an updated second undivided map. Alternatively, the mobile robot can fill the second areas in binary map A as obstacles (i.e., black areas) based on the contours of the second areas in divided map B, removing the divided areas from binary map A to obtain the updated second undivided map.

FIG. 7 illustrates a schematic diagram of an application scenario according to one embodiment. The application scenario is exemplified by taking an example where the first area A2 and the first area A3 shown in sub-figure (c) of FIG. 6 are added to the divided second areas.

Assume that the mobile robot can obtain divided map B, as shown in sub-figure (a) in FIG. 7, based on the contours of the already divided second areas. The binary map A corresponding to the target area currently obtained by the mobile robot is as shown in sub-figure (b) in FIG. 3. At this point, the mobile robot updates the second undivided map based on divided map B and binary map A. The updated second undivided map can be as shown in sub-figure (b) in FIG. 7.

In one embodiment, after obtaining the updated second undivided map, the mobile robot can divide the areas in the second undivided map according to a preset size, resulting in divided first areas (hereinafter referred to as first areas C). For each first area C, the mobile robot can determine the corresponding already divided area (i.e., the third area) and merge first area C into the corresponding third area.

It should be understood that the preset size can be specifically determined based on the actual scenario, and the present disclosure does not impose any restrictions.

In one example, for each first area C, the mobile robot can obtain the contour of first area C and the contours of the various second areas. The mobile robot can then identify a target contour from the contours of the second areas that is adjacent to the contour of first area C. The second area corresponding to the target contour can be determined as the third area corresponding to first area C.

It is understood that adjacent contours can refer to two contours whose distance is less than a preset distance threshold. The preset distance threshold can be specifically determined based on the actual scenario. For example, the preset distance threshold can be set to any value such as 0 pixels, 1 pixel, or another value, depending on the scenario.

In one embodiment, for a given first area C, when there are multiple target contours, the mobile robot can determine the numbers of adjacent pixel points between the contour of first area C and each target contour. The second area corresponding to the target contour with the most adjacent pixel points can then be determined as the third area corresponding to first area C.

In one embodiment, for each first area C, the mobile robot can obtain the bounding rectangle of first area C (hereinafter referred to as the first bounding rectangle) and the bounding rectangles of the second areas (hereinafter referred to as the second bounding rectangles). The mobile robot can then identify the second bounding rectangles (hereinafter referred to as the third bounding rectangles) that intersect with the first bounding rectangle. For example, the mobile robot can perform an AND operation between the first bounding rectangle and each of the second bounding rectangles to determine the third bounding rectangles that intersect with the first bounding rectangle. Then, the mobile robot can identify the target contour in the contours of the fourth areas that is adjacent to the contour of the first area and determine the fourth area corresponding to the target contour as the third area. The fourth area can be the second area corresponding to the third bounding rectangle. In other words, the mobile robot first checks whether the bounding rectangles intersect and then only examines the second areas with intersecting bounding rectangles to determine if their contours are adjacent to the contour of the first area. This reduces the computational load for contour adjacency determination, improves the speed and efficiency of identifying the third areas, and increases the overall efficiency of map dividing.

In one embodiment, for a given first area C, when there are multiple target contours, the mobile robot can determine the numbers of adjacent pixel points between the contour of first area C and each target contour. The third area can then be determined as the area corresponding to the target contour with the highest number of adjacent pixel points.

It should be understood that for a given first area C, if there are no target contours adjacent to the contour of first area C, the mobile robot may choose not to merge first area C during the current merging process. In other words, during this merging process, the mobile robot may decide not to merge first area C into the already divided areas.

Figure 8:
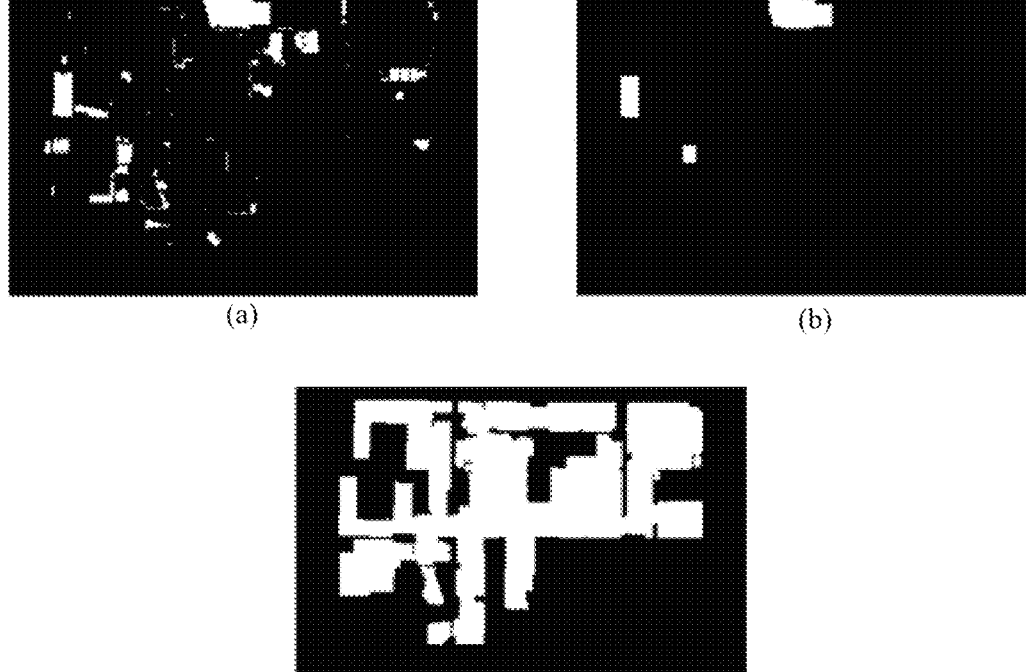
FIG. 8 illustrates a schematic diagram of an application scenario according to another embodiment.

FIG. 8 illustrates a schematic diagram of another application scenario according to one embodiment. Assume that the updated second undivided map obtained by the mobile robot based on divided map B and binary map A is as shown in sub-figure (a) of FIG. 8. Assume that the mobile robot divides the areas in the second undivided map according to a preset size, resulting in divided first areas C as shown in sub-figure (b) in FIG. 8.

The mobile robot can determine the third areas corresponding to first areas C based on the contours of first areas C and the contours of the already divided second areas. It can then merge each first area C into its corresponding third area, resulting in the map after merging first areas C, as shown in sub-figure (c) of FIG. 8.

It should be noted that after merging first areas C, the mobile robot can update the binary map. This includes updating the divide second areas and the undivided first areas in the binary map. That is, update the contours and bounding rectangles of the undivided first areas according to the merged first areas C, and update the contours and bounding rectangles of the divided second areas. Subsequently, the mobile robot can adjust the preset size, for example, by reducing it, and divide the updated undivided first areas according to the adjusted size, resulting in divided first areas (hereinafter referred to as first areas D). For each first area D, the mobile robot can determine the corresponding already divided area (i.e., the third area) and merge first area D into the corresponding third area. This process continues until no more undivided first areas can be merged into the divided areas or the merging of undivided first areas is completed, resulting in the final map dividing.

FIG. 9 illustrates a schematic diagram of another application scenario according to one embodiment. This scenario uses the merged map obtained by merging first areas C, as shown in sub-figure (c) of FIG. 8, as an example for illustrative purposes.

After merging first areas C and obtaining the merged map shown in sub-figure (c) of FIG. 8, the mobile robot can update the binary map to get the updated binary map as shown in sub-figure (a) of FIG. 9. Subsequently, the mobile robot can re-merge the undivided first areas based on the updated binary map until no more undivided first areas can be merged into the divided areas or the merging of undivided first areas is completed, resulting in the final map dividing.

For example, the mobile robot can perform a secondary dividing on the binary map shown in sub-figure (b) of FIG. 9 to obtain the map dividing result as shown in sub-figure (c) of FIG. 9.

In the method discussed above, after obtaining the binary map corresponding to a target area, the mobile robot can determine the first areas in the binary map based on the partition information from the previous partitioning. The first areas are undivided areas in the binary map, and the partition information corresponds to the second areas in the binary map, which are already divided areas. Then, for each first area, depending on the size of the first area, the mobile robot can designate the first area as a new second area or merge it into an already partitioned third area, where the third area is one of the second area. This allows accurate partitioning of newly appeared areas, reducing the complexity of the map and making it easier for the mobile robot to clean the target area based on the partitions. This improves the cleaning efficiency of the mobile robot and enhances the user experience.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

Corresponding to the method described in the above embodiments, FIG. 10 illustrates a block diagram of a device for area dividing in a map for a mobile robot according to one embodiment. For the sake of clarity, only the relevant parts are shown.

In one embodiment, the device may include a binary map acquisition module 901, a first area determination module 902, a map partition module 903 and a control module 904.

The binary map acquisition module 901 is to obtain a binary map of a target area. The first area determination module 902 is to determine one or more first areas in the binary map according to partition information. The one or more first areas are undivided areas in the binary map, the partition information corresponds to second areas in the binary map, and the second areas are divided areas in the binary map. The map partition module 903 is to, for each first area of the one or more first areas, determine, according to size of the first area, the first area as a newly added second area, or merging the first area into a third area that is one of the second areas, thereby obtaining a target area-dividing map. The control module 904 is to control the mobile robot according to the target area-dividing map.

In one embodiment, the first area determination module 902 is to: create a first undivided map; determine contours of the second areas according to the partition information; copy the binary map to the first undivided map, and fill the second areas in the first undivided map with obstacles according to the contours of the second areas, so as to obtain a second undivided map. The second undivided map may include one or more of the first areas.

In another embodiment, the first area determination module 902 is to: create a first undivided map; determine contours of the second areas according to the partition information; fill the second areas in the first undivided map to obtain a third undivided map according to the contours of the second areas; and perform bitwise XOR operation on the binary map and the third undivided map to obtain a second undivided map. The second undivided map includes one or more of the first areas.

In another embodiment, map partition module 903 is to: determine a length and a width of the first area; in response to the length and the width of the first area being greater than or equal to a first preset threshold, determine an area of the first area; in response to the area of the first area is greater than or equal to a second preset threshold, determine the first area as the newly added second area; and in response to the length or the width of the first area is less than the first preset threshold, or the area of the first area is less than the second preset threshold, merge the first area into the third area.

In one embodiment, the device may further include a contour acquisition module, a target contour determination module and a third area determination module. The contour acquisition module is to obtain contours of the first areas and contours of the second areas. The target contour determination module is to determine one or more target contours adjacent to the contours of the first areas from the contours of the second areas. The third area determination module is to determine one or more second areas corresponding to the one or more target contours as the third areas.

In one embodiment, the device may further include a bounding rectangle acquisition module and a third bounding rectangle determination module. The bounding rectangle acquisition module is to obtaining first bounding rectangles for the first areas and second bounding rectangles for the second areas. The third bounding rectangle determination module is to determine one or more of the third bounding rectangles that have an intersection with the first bounding rectangles from the second bounding rectangles. The target contour determination module is further to, from contours of fourth areas, determine target contours adjacent to the contours of the first areas. The fourth areas are the second areas corresponding to the third bounding rectangles. The third area determination module is further to determine the fourth areas corresponding to the target contour as the third areas.

In one embodiment, the third area determination module is further to, in response to there being multiple target contours, obtain numbers of pixels of the contours of the first areas adjacent to each of target contours and determine one of the fourth areas corresponding to one of the target contours with the largest number of pixels as the third area.

Each unit in the device discussed above may be a software program module, or may be implemented by different logic circuits integrated in a processor or independent physical components connected to a processor, or may be implemented by multiple distributed processors.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for area dividing in a map for a mobile robot, the method comprising:
obtaining a binary map corresponding to a target area;
determining one or more first areas in the binary map according to partition information, wherein the one or more first areas are undivided areas in the binary map, the partition information corresponds to second areas in the binary map, and the second are as are divided areas in the binary map;
for each first area of the one or more first areas, determining, according to a size of the first area, the first area as a newly added second area, or merging the first area into a third area that is one of the second areas, thereby obtaining a target area-dividing map; and
controlling the mobile robot according to the target area-dividing map;
wherein determining, according to the size of the first area, the first area as the newly added second area, or merging the first area into the third area that is one of the second areas, comprises:
determining a length and a width of the first area;
in response to the length and the width of the first area being greater than or equal to a first preset threshold, determining an area of the first area;
in response to the area of the first area being greater than or equal to a second preset threshold, determining the first area as the newly added second area; and
in response to the length or the width of the first area being less than the first preset threshold, or the area of the first area being less than the second preset threshold, merging the first area into the third area.

2. The method of claim 1, wherein determining the one or more first areas in the binary map according to partition information comprises:
creating a first undivided map;
determining contours of the second areas according to the partition information;
copying the binary map to the first undivided map, and filling the second areas in the first undivided map with obstacles according to the contours of the second areas, so as to obtain a second undivided map, wherein the second undivided map comprises one or more of the first areas.

3. The method of claim 1, wherein determining the one or more first areas in the binary map according to partition information comprises:
creating a first undivided map;
determining contours of the second areas according to the partition information;
filling the second areas in the first undivided map to obtain a third undivided map according to the contours of the second areas; and
performing bitwise XOR operation on the binary map and the third undivided map to obtain a second undivided map, wherein the second undivided map includes one or more of the first areas.

4. The method of claim 1, further comprising, before merging the first area into the third area,
obtaining contours of the first areas and contours of the second areas;
determining one or more target contours adjacent to the contours of the first areas from the contours of the second areas; and
determining one or more second areas corresponding to the one or more target contours as the third areas.

5. The method of claim 1, further comprising, before merging the first area into the third area,
obtaining first bounding rectangles for the first areas and second bounding rectangles for the second areas;
determining one or more of the third bounding rectangles that have an intersection with the first bounding rectangles from the second bounding rectangles;

from contours of fourth areas, determining target contours adjacent to the contours of the first areas, wherein the fourth areas are the second areas corresponding to the third bounding rectangles; and determining the fourth areas corresponding to the target contour as the third areas.

6. The method of claim 5, wherein determining the fourth areas corresponding to the target contour as the third areas comprises:

in response to there being multiple target contours, obtaining numbers of pixels of the contours of the first areas adjacent to each of the target contours; and determining one of the fourth areas corresponding to one of the target contours with the largest number of pixels as the third area.

7. A mobile robot comprising:

one or more processors; and a memory coupled to the one or more processors, the memory storing programs that, when executed by the one or more processors, cause performance of operations comprising:

obtaining a binary map corresponding to a target area;

determining one or more first areas in the binary map according to partition information, wherein the one or more first areas are undivided areas in the binary map, the partition information corresponds to second areas in the binary map, and the second are as are divided areas in the binary map;

for each first area of the one or more first areas, determining, according to a size of the first area, the first area as a newly added second area, or merging the first area into a third area that is one of the second areas, thereby obtaining a target area-dividing map; and controlling the mobile robot according to the target area-dividing map; wherein determining, according to the size of the first area, the first area as the newly added second area, or merging the first area into the third area that is one of the second are as, comprises:

determining a length and a width of the first area;

in response to the length and the width of the first area being greater than or equal to a first preset threshold, determining an area of the first area;

in response to the area of the first area being greater than or equal to a second preset threshold, determining the first area as the newly added second area; and in response to the length or the width of the first area being less than the first preset threshold, or the area of the first area being less than the second preset threshold, merging the first area into the third area.

8. The mobile robot of claim 7, wherein determining the one or more first areas in the binary map according to partition information comprises:

creating a first undivided map;

determining contours of the second areas according to the partition information;

copying the binary map to the first undivided map, and filling the second areas in the first undivided map with obstacles according to the contours of the second areas, so as to obtain a second undivided map, wherein the second undivided map comprises one or more of the first areas.

9. The mobile robot of claim 7, wherein determining the one or more first areas in the binary map according to partition information comprises:

creating a first undivided map;

determining contours of the second areas according to the partition information;

filling the second areas in the first undivided map to obtain a third undivided map according to the contours of the second areas; and performing bitwise XOR operation on the binary map and the third undivided map to obtain a second undivided map, wherein the second undivided map includes one or more of the first areas.

10. The mobile robot of claim 7, wherein the operations further comprise, before merging the first area into the third area, obtaining contours of the first areas and contours of the second areas;

determining one or more target contours adjacent to the contours of the first areas from the contours of the second areas; and determining one or more second areas corresponding to the one or more target contours as the third areas.

11. The mobile robot of claim 7, wherein the operations further comprise, before merging the first area into the third area, obtaining first bounding rectangles for the first areas and second bounding rectangles for the second areas;

determining one or more of the third bounding rectangles that have an intersection with the first bounding rectangles from the second bounding rectangles;

from contours of fourth areas, determining target contours adjacent to the contours of the first areas, wherein the fourth areas are the second areas corresponding to the third bounding rectangles; and determining the fourth areas corresponding to the target contour as the third areas.

12. The mobile robot of claim 11, wherein determining the fourth areas corresponding to the target contour as the third areas comprises:

in response to there being multiple target contours, obtaining numbers of pixels of the contours of the first areas adjacent to each of the target contours; and determining one of the fourth areas corresponding to one of the target contours with the largest number of pixels as the third area.

13. A non-transitory computer-readable storage medium storing instructions that, when executed by at least one processor of a mobile robot, cause the at least one processor to perform a method, the method comprising:

obtaining a binary map corresponding to a target area;

determining one or more first areas in the binary map according to partition information, wherein the one or more first areas are undivided areas in the binary map, the partition information corresponds to second areas in the binary map, and the second areas are divided areas in the binary map;

for each first area of the one or more first areas, determining, according to a size of the first area, the first area as a newly added second area, or merging the first area into a third area that is one of the second areas, thereby obtaining a target area-dividing map; and controlling the mobile robot according to the target area-dividing map; wherein determining, according to the size of the first area, the first area as the newly added second area, or merging the first area into the third area that is one of the second are as, comprises:

determining a length and a width of the first area;

in response to the length and the width of the first area being greater than or equal to a first preset threshold, determining an area of the first area;

in response to the area of the first area being greater than or equal to a second preset threshold, determining the first area as the newly added second area; and in response to the length or the width of the first area being less than the first preset threshold, or the area of the first area being less than the second preset threshold, merging the first area into the third area.

14. The non-transitory computer-readable storage medium of claim 13, wherein determining the one or more first areas in the binary map according to partition information comprises:

creating a first undivided map;

determining contours of the second areas according to the partition information;

copying the binary map to the first undivided map, and filling the second areas in the first undivided map with obstacles according to the contours of the second areas, so as to obtain a second undivided map, wherein the second undivided map comprises one or more of the first areas.

15. The non-transitory computer-readable storage medium of claim 13, wherein determining the one or more first areas in the binary map according to partition information comprises:

creating a first undivided map;

determining contours of the second areas according to the partition information;

filling the second areas in the first undivided map to obtain a third undivided map according to the contours of the second areas; and performing bitwise XOR operation on the binary map and the third undivided map to obtain a second undivided map, wherein the second undivided map includes one or more of the first areas.

16. The non-transitory computer-readable storage medium of claim 13, wherein the method further comprises, before merging the first area into the third area, obtaining contours of the first areas and contours of the second areas;

determining one or more target contours adjacent to the contours of the first areas from the contours of the second areas; and determining one or more second areas corresponding to the one or more target contours as the third areas.

17. The non-transitory computer-readable storage medium of claim 13, wherein the method further comprises, before merging the first area into the third area, obtaining first bounding rectangles for the first areas and second bounding rectangles for the second areas;

determining one or more of the third bounding rectangles that have an intersection with the first bounding rectangles from the second bounding rectangles;

from contours of fourth areas, determining target contours adjacent to the contours of the first areas, wherein the fourth areas are the second areas corresponding to the third bounding rectangles; and determining the fourth areas corresponding to the target contour as the third areas.

18. The non-transitory computer-readable storage medium of claim 17, wherein determining the fourth areas corresponding to the target contour as the third areas comprises:

in response to there being multiple target contours, obtaining numbers of pixels of the contours of the first areas adjacent to each of the target contours; and determining one of the fourth areas corresponding to one of the target contours with the largest number of pixels as the third area.

19. The non-transitory computer-readable storage medium of claim 13, wherein, before determining the one or more first areas in the binary map according to the partition information, the method further comprises:

performing denoising on the binary map to remove obstacles.

20. The non-transitory computer-readable storage medium of claim 17, wherein the binary map is autonomously generated by the mobile robot.

\* \* \* \* \*